United States Patent [19]

Vaurigaud

[11] 4,247,009
[45] Jan. 27, 1981

[54] PIPE RACK FASTENER

[76] Inventor: Christopher R. Vaurigaud, 614 1/2 N. Woodlawn Ave., Metairie, La. 70001

[21] Appl. No.: 925,752

[22] Filed: Jul. 18, 1978

[51] Int. Cl.³ ............................................. A47F 7/00
[52] U.S. Cl. .................................. 211/60 R; 254/231
[58] Field of Search ..................... 211/60 R, 49 R; 254/161, 149, 67; 250/179 A; 105/469; 24/115 R

[56] References Cited

U.S. PATENT DOCUMENTS

| | | | |
|---|---|---|---|
| 2,476,555 | 7/1949 | Lunde | 254/67 X |
| 2,655,332 | 10/1953 | Carpenter et al. | 248/73 |
| 2,715,012 | 8/1955 | Huber | 254/67 |
| 2,773,700 | 12/1956 | Lasswell | 280/179 |
| 3,002,726 | 10/1961 | Ford | 254/67 |
| 3,008,731 | 11/1961 | Bombardier | 280/179 |
| 3,387,813 | 6/1968 | Carino | 248/361 |
| 3,458,215 | 7/1969 | Maradyn | 280/179 |
| 3,517,828 | 6/1970 | Hunter | 211/194 |
| 3,888,538 | 6/1975 | Williams | 296/3 |
| 3,901,476 | 8/1975 | Giampaglia | 254/67 |
| 3,960,301 | 6/1976 | Miller | 224/42.1 R |
| 4,011,974 | 3/1977 | Scarola | 224/42.1 B |
| 4,057,281 | 11/1977 | Garrett | 296/3 |

Primary Examiner—Francis K. Zugel
Assistant Examiner—Robert W. Gibson, Jr.
Attorney, Agent, or Firm—Roylance, Abrams, Berdo & Farley

[57] ABSTRACT

A fastener for securing pipes to a rack includes a tensioning mechanism, a bracket for mounting the tensioning mechanism to the rack, and a flexible cord. The tensioning mechanism has a tubular housing, a threaded shaft mounted in the housing to rotate about its longitudinal axis while being fixed axially, and a movable bracket threaded on the threaded shaft and mounted in the housing so that it will move up and down along the length of the housing in response to rotation of the threaded shaft. The flexible cord has one end fixed to the mounting bracket and knots spaced along a portion of the length of the cord adjacent its free end. The cord is wrapped around the articles to be held on the rack and one of the knots in the cord is selectively and releasably positioned in a notch in the movable bracket. Rotation of the threaded shaft in one direction will cause the cord to tighten about the articles and rack to fixedly secure the articles to the rack.

10 Claims, 3 Drawing Figures

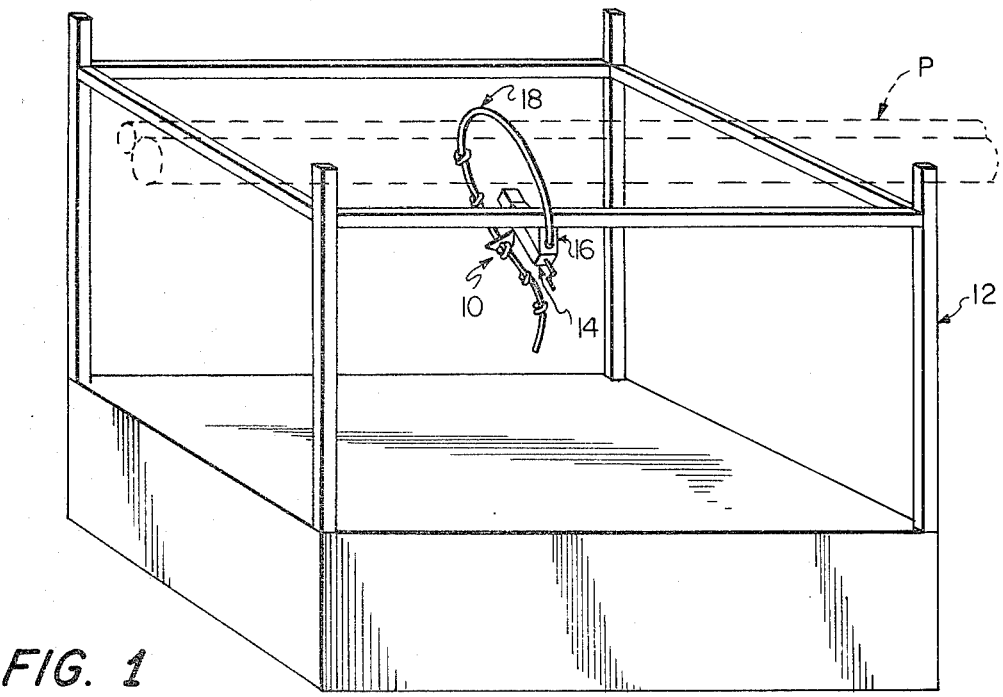
FIG. 1
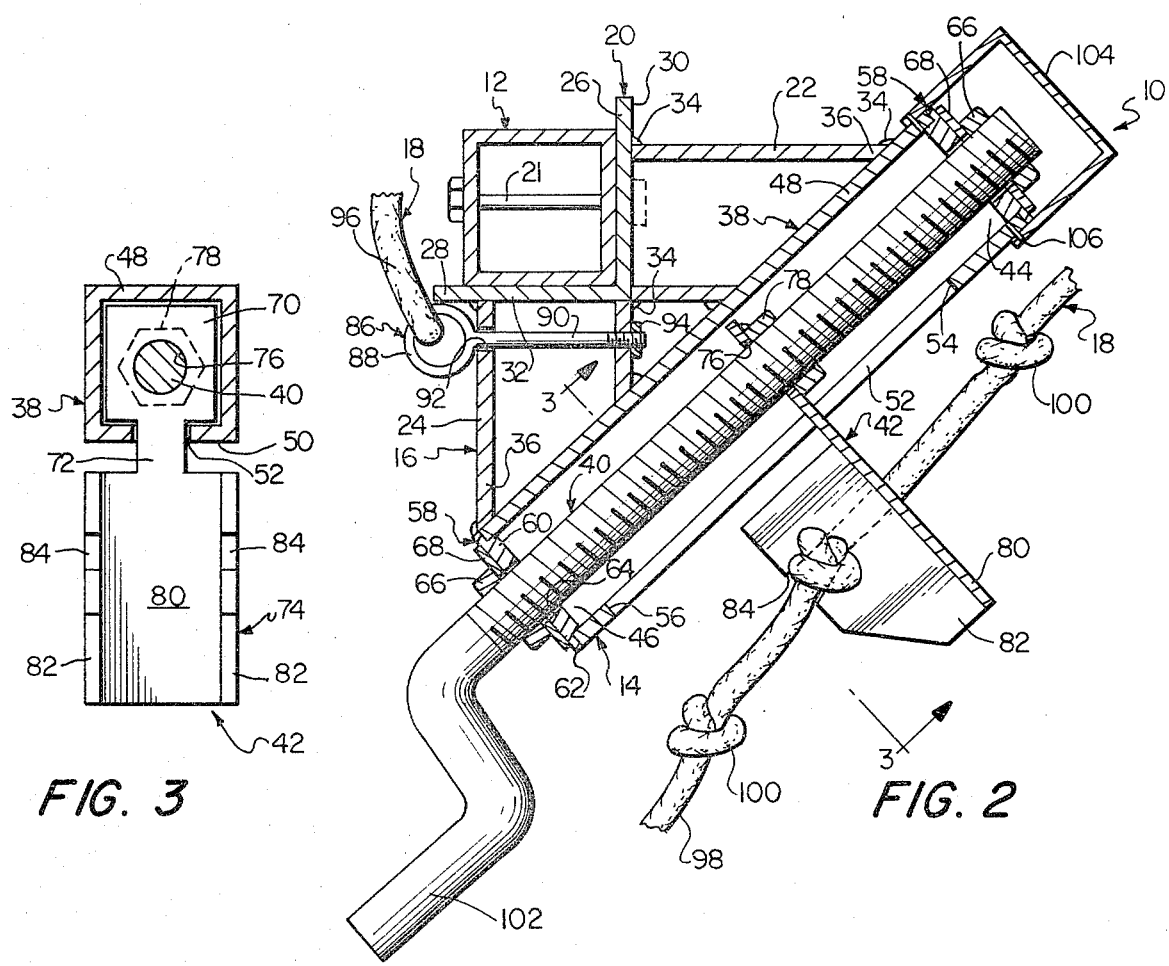
FIG. 3
FIG. 2

PIPE RACK FASTENER

BACKGROUND OF THE INVENTION

The present invention relates to a fastener for securing pipe-like articles to a rack, e.g., for securing plumber's pipes on a rack on a truck. More particularly, the present invention relates to a fastener having a flexible cord which is looped about the rack and pipe supported thereon and which permits a rough adjustment of the loop size and then tensioning of the cord to retain securely the pipes on the rack.

Known and conventional fasteners for securing elongated articles to a rack upon which they are supported include a tensioning mechanism, mounting means for supporting the tensioning mechanism on a rack and a flexible cord. Typical examples are U.S. Pat. Nos. 2,773,700, Lasswell; 3,458,215, Maradyn; and 4,011,974, Scarola.

The Lasswell patent discloses a fastener arrangement in which one end of a flexible cord is attached to a fixed portion of a tensioning mechanism mounted below a rack, the other end is attached to a movable portion of the tensioning mechanism, and the remainder of the cord is wrapped about the rack and the pipe supported thereon. A motor-driven threaded shaft is employed to drive the movable portion of the Lassell device. In the Lasswell device, no provision is made for roughly adjusting the size of the loop.

The devices disclosed in the Maradyn and Scarola patents have two-step tensioning mechanisms. In the Maradyn patent, a rough adjustment of the loop is accomplished by engaging selective links of a chain on a hook fixedly mounted on the rack, while final tensioning of the loop is accomplished by winding the flexible cord on a winch located remote from the hook. In the Scarola patent, the initial positioning of its flexible cord is accomplished by a mechanism which frictionally engages the cord at selective positions along the length of the cord, while final tensioning is accomplished by a screw mechanism.

Other flexible cord type fasteners for securing various objects to supports are disclosed in U.S. Pat. Nos. 2,715,012, Huber; 3,387,813, Carino; 3,960,301, Miller; 2,655,332, Carpenter et al; and 3,008,731, Bombardier. Suitable racks with which the pipe rack fastener of the present invention may be used are disclosed in U.S. Pat. Nos. 3,888,538, McWilliams; and 4,057,281, Garrett.

The above prior art devices suffer from numerous disadvantages. For example, since the device of the Lasswell patent is not able to vary the size of its loop other than by the movement of the movable member of the tensioning mechanism, the amount to which the loop size may be varied is greatly restricted. This prevents the Lasswell device from being employed to secure a wide range of differently sized articles. The device of the Scarola patent couples the free end of the flexible cord to the tensioning mechanism solely by a frictional engagement. This frictional engagement would be ineffective and would tend to slip when a high tension load is placed on the cord. In the device of the Maradyn patent, the mechanisms for initially adjusting the size of the loop and for tensioning the loop are remotely spaced, thereby making the operation of the device inefficient.

Furthermore, the prior art devices are relatively complex in construction, are expensive and difficult to manufacture and maintain, are of relatively large weight and size, do not permit rapid and easy operation, and are difficult to mount securely to a rack.

SUMMARY OF THE INVENTION

Accordingly, it is an object of the present invention to provide a pipe rack fastener of simple construction which may be simply and effectively employed to secure pipes to a rack. In particular, it is the object of the present invention to provide a pipe rack fastener which has a flexible cord with one end fixed to a fixed portion of the fastener and with the portion of the cord adjacent its other end having a plurality of enlargements spaced along the length of such portion for selective engagement with the movable portion of a tensioning mechanism.

Another object of the present invention is to provide a pipe rack fastener of rugged construction which is inexpensive and simple to manufacture, maintain, and operate.

The foregoing objects are attained by providing a pipe rack fastener for securing pipe-like articles to a rack comprising a tensioning mechanism having a fixed portion, a movable portion and driving means for moving the movable portion relative to the fixed portion, the movable portion including coupling means for releasably receiving a flexible cord, mounting means coupled to the tensioning mechanism for attaching the tensioning mechanism to a rack, and a flexible cord having a fixed end attached to the mounting means or the fixed portion of the tensioning mechanism and a free-end portion with a plurality of enlargements fixed thereon and spaced along its length, each of the enlargements adapted to be selectively and releasably coupled to the coupling means of the movable portion of the tensioning mechanism so that when the fastener is attached to a rack, the cord may be looped about the rack and articles thereon with the size of the loop roughly set by selectively coupling a particular enlargement to the coupling means, and the articles are secured on the rack by actuating the driving means to move the movable member to tighten the cord about the articles.

By forming the flexible cord with a plurality of enlargements spaced along the portion of the cord adjacent its free end, the size of the loop may be effectively and simply adjusted. Since the enlargements may be easily formed, for example by providing knots in the cord, the cost of manufacturing the fastener is kept low and the operation of the fastener is simplified. Further, the enlargements permit the coupling means on the movable member to be simply constructed, for example the coupling means may comprise a U-shaped channel having notches in its legs which permit the cord to pass therethrough while entrapping the enlargements therein.

Additionally, the specific construction of the present invention, described hereinafter, of the bracket for mounting the tensioning mechanism to a rack, of attaching the fixed end of the flexible cord to the fastener, of mounting a rotatable screw within the tubular housing of the tensioning mechanism, and of forming a tensioning mechanism movable member with the coupling means aid in the attainment of the objects of the invention noted above.

Other objects, advantages, and salient features of the present invention will become apparent from the following detailed description, which taken in conjunction with the annexed drawings, discloses a preferred embodiment of the present invention.

As used in this application, "pipe" is intended to include within its meaning any elongated article, and "rack" is intended to include within its meaning any support therefor.

BRIEF DESCRIPTION OF THE DRAWINGS

Referring to the drawings which form a part of this original disclosure:

FIG. 1 is a perspective view illustrating a rack with a pipe rack fastener in accordance with the present invention mounted thereon;

FIG. 2 is a longitudinal, cross-sectional view in elevation illustrating the details of the pipe rack fastener of FIG. 1; and FIG. 3 is a fragmentary cross-sectional view taken along lines 3—3 of FIG. 2.

DETAILED DESCRIPTION OF THE INVENTION

Referring to FIG. 1, the pipe rack fastener 10 is adapted to be secured to a rack 12 immediately below its article support portion, and adjacent one side and between the ends thereof. The rack may be mounted on a vehicle. The fastener 10 includes a tensioning mechanism 14, a mounting bracket 16 and a flexible cord 18. A pipe P is graphically illustrated in phantom lines.

The details of the pipe rack fastener 10 are illustrated in FIGS. 2 and 3. As illustrated in FIG. 2, the mounting bracket 16 comprises an L-shaped brace 20 and first and second tubes 22, 24, respectively.

The L-shaped brace 20 has two legs 26, 28 formed as a unitary member and oriented at a right angle relative to each other. The legs 26, 28 may have openings (not shown) therethrough to facilitate attachment of the brace 20 to the rack 12, e.g., by bolts 21. The tubes 22, 24 are square in cross-section. The brace 20 may be formed to extend in a direction perpendicular to the plane of FIG. 2 for a distance greater than the extent of the tubes 22, 24 in that direction to facilitate mounting. Additionally, an angle iron brace (not shown) may be attached to tension mechanism 14 and the brace 20 to give the fastener 10 greater strength.

The tube 22 is attached to and extends outwardly from the outer face 30 of leg 26 so that the longitudinal axis of the tube 22 is perpendicular to the plane of leg 26. The tube 24 is attached to and extends outwardly from the outer face 32 of leg 28 so that the longitudinal axis of tube 24 is perpendicular to the plane of leg 28 and to the longitudinal axis of the tube 24. The tubes 22, 24 may be secured to the brace 20 by means of welds 34, a suitable adhesive or other conventional fastening means. The ends 36 of the tubes 22, 24 remote from the ends attached to the brace 20 are cut along a common 45° angle so that a line along and connecting the ends 36 forms a right triangle with tubes 22, 24 with such line forming the hypotenuse of that right triangle.

The tensioning mechanism 14 includes a tubular housing 38, a threaded shaft 40 and a movable bracket 42. The housing 38 constitutes the fixed portion of the tensioning mechanism 14.

The housing 38 is formed from a tube of square cross section and has upper and lower open ends 44, 46, respectively. One longitudinal side 48 of the housing 38 is fixed to the ends 36 of the tubes 22, 24 by welds 34. In this manner, the housing 38 forms the hypotenuse of the right triangle formed by the housing 38 and tubes 22, 24.

The longitudinal side 50 of housing 38 opposite to side 48 has a longitudinal slot 52 extending parallel to the longitudinal axis of the housing 38. The slot 52 terminates short of the ends 44, 46 of the housing 38 in order that remaining portions of the side 50 form upper and lower stop shoulders 54, 56, respectively, at the longitudinal ends of the slot 52.

The threaded shaft 40 is coaxially mounted within the tubular housing 38 so that it will rotate about its longitudinal axis but be fixed axially. To mount the threaded shaft 40 in this manner, the open longitudinal ends 44, 46 are closed by identical end caps 58. Each end cap 58 has an inner part 60 and an outer part 62 forming a unitary piece. The inner parts 60 have a square cross-sectional configuration of such size to form an interference fit with the inside surface of the housing ends 44, 46. The outer parts 62 have a square cross-sectional configuration of the same size as the cross section of the housing 38 so that the outer parts 62 completely cover the ends 44, 46. A central opening 64 extends through each of the end caps 58.

The threaded shaft 40 extends through each of the central openings 64. A nut 66 is fixed on each end of the threaded shaft 40 adjacent the outside surface of each end cap 58. A washer 68 is mounted on each end of the threaded shaft 40 and interposed between the nuts 66 and the end caps 58 to facilitate rotation of the shaft 40.

The movable bracket 42 constitutes the movable portion of the tensioning mechanism and includes a plate 70, a flange 72, and a U-shaped channel 74. The plate 70 is square and of a size slightly smaller than the internal configuration of the housing 38. This permits the plate 70 to slide along the length and within the housing 38 while being fixed against rotation about the longitudinal axis of the housing 38.

A central aperture 76 is formed in the plate. A threaded nut 78 is welded to the upper surface of the plate 70 with the threaded opening in the nut 78 coaxial with the central aperture 76. The threaded shaft 40 extends through the central aperture 76 and threadedly engages the nut 78.

The flange 72 is formed as a unitary portion of the plate 70 and extends laterally therefrom through the slot 52 to the exterior of the housing 38. As illustrated in FIG. 3, the flange 72 has a width slightly less than that of slot 52. One end of the U-shaped channel 74 is formed as a unitary part of the flange 72.

The U-shaped channel 74 constitutes the means for coupling the cord 18 to the movable bracket 42 and includes a bight 80 which is formed as an extension of and is coplanar with the flange 72. Two legs 82 extend downwardly and along the lateral edges of the bight 80 at a right angle thereto. Each leg 82 has a notch extending upwardly from its end remote from the bight 80 which opens on such end and terminates short of the bight 80.

The flexible cord 18 is fixed to the tube 24 by an eye bolt 86. The eye bolt 86 has an eye 88 and a threaded shaft 90 extending therefrom and integrally attached thereto. The threaded shaft 90 extends through openings 92 in opposed lateral sides of the tube 24. The eye 88 is positioned adjacent the longitudinal side of the tube 24 remote from the tube 22. The eye 88 is of greater dimension than the opening 92 so that the eye 88 acts as a stop to prevent overinsertion of the eye bolt 86. A nut 94 is threaded on the end of the shaft 90 remote from the eye 88 to fix the eye bolt 86 in the tube 24. The fixed end 96 of the cord 18 is wrapped about and secured to the eye 88 in a conventional manner, such as by an eye splice.

The portion of the flexible cord adjacent its free end 98 has a series of enlargements or knots 100 spaced along that portion of the length of the cord 18. The cross-sectional dimension of the cord 18 is somewhat less than the width of the notches 84 to facilitate insertion of the cord 18 within the notches 84. The enlargements or knots 100 are substantially larger than the width of the notches 84 to prevent the knots 100 from slipping through the notches 84.

A crank-like handle 102 extends from the lower portion of the threaded shaft 40 to facilitate rotation of the shaft 40 within the housing 38. A cover 104 is fixed to the upper portion of the housing 38 to cover the end of the threaded shaft 40 remote from the handle 102. The cover 104 fits over a portion of housing 38 and is fixed to housing 38 by screws 106.

After the pipe rack fastener 10 of the present invention has been mounted on a rack 12, it is available to secure pipes P which have been placed on the rack 12. To do this, the flexible cord 18 is looped about the rack and pipe supported thereon with the fixed end 96 of the cord 18 fixed to the eye 88. The crank 102 is rotated in one direction until the movable bracket 42 is located adjacent the upper stop shoulder 54. The size of the loop formed by the flexible cord 18 is roughly set by selectively inserting a portion of the cord 18 adjacent a particular enlargement 100 within one of the notches 84 with the enlargement 100 located between the legs 82 of the U-shaped channel 74. Once the cord 18 is engaged in the movable bracket 42, the crank 102 is rotated in the opposite direction to cause the movable bracket 42 to move down along the length of the housing 38 to pull the cord 18 tight about the pipes P.

To release the pipes, the crank 102 is rotated in a direction so as to move the movable bracket 42 towards the stop shoulder 54. This will loosen the tension on the cord 18. After the cord 18 has been slackened, the cord 18 may then be easily removed from the notch 84 and removed from about the pipes to permit removal of the pipes from the rack 12.

The stop shoulder 56 prevents the movable bracket 42 from being lowered to too great an extent. If the movable bracket 42 contacts the lower stop shoulder 56 without sufficient tension being placed in the cord 18, the movable bracket 42 may be raised in order that the next enlargement 100 may be inserted within the U-shaped channel 74 to decrease the loop size. In this manner, the pipe rack fastener 10 of the present invention is able to secure loads of vastly different sizes on a rack 12.

Since two notches 84 are provided in the U-shaped channel 74, two separate flexible cords 18 may be attached thereto. This permits two differently sized loads which may not be effectively combined to be secured by the same fastener 10, except with two cords. Also, since the pipe rack fastener 10 is mounted on the rack 12 so that the crank 102 extends outwardly from the rack 12, the crank 102, the cord 18 and the movable bracket 42 are each easily accessible to an operator standing immediately adjacent the outside of the rack 12.

The various parts of the pipe rack fastener 10 of the present invention may be formed of metal, plastic or other suitable material.

While a particular embodiment has been chosen to illustrate the invention, it will be understood by those skilled in this art that various changes and modifications can be made therein without departing from the scope of the invention as defined in the appended claims. For example, the plate 70 and the housing 38 may be formed in any polygonal configuration. Also, the tubes 22, 24 may be made of solid construction and in any cross-sectional shape. Further the enlargements 100 may comprise separate pieces fixed on the cord 18 rather than being knots in the cord 18. The cord can be formed of nylon.

What is claimed is:

1. A pipe rack fastener for securing pipe-like articles to a rack comprising:
 a tensioning mechanism having a fixed portion, a movable portion and driving means for moving said movable portion relative to said fixed portion, said movable portion including coupling means for releasably receiving a flexible cord;
 mounting means coupled to said tensioning mechanism for attaching said tensioning mechanism to said rack; and
 a flexible cord having a fixed end and a free end, said fixed end being fixedly attached to one of said mounting means and said tensioning mechanism fixed portion by an eye bolt having a threaded stem and an eye with said cord fixed end coupled to said eye and with said threaded stem extending through a portion of one of said mounting means and said tensioning mechanism fixed portion and fixed thereto by a nut threaded on said threaded stem, the portion of said cord adjacent said free end having a plurality of enlargements fixed thereon and spaced along the length of said free end portion of said cord, each of said enlargements adapted to be selectively and releasably coupled to said coupling means of said tensioning mechanism movable portion;
 whereby, when the fastener is attached to a rack, said cord may be looped about the rack and articles thereon with the size of the loop roughly set by selectively coupling a particular enlargement to said coupling means, and the articles may be secured on the rack by actuating said driving means to move said movable portion to tighten said cord about the articles.

2. A pipe rack fastener according to claim 1, wherein said enlargements comprise knots in said cord.

3. A pipe rack fastener according to claim 1, wherein said tensioning mechanism comprises a tubular housing and said driving means comprises a threaded shaft; said housing having open longitudinal ends which are closed by end caps fixed in said open longitudinal ends; each of said end caps having a central opening therethrough, said threaded shaft extends through said end cap central openings; a nut is fixed on each end of said threaded shaft adjacent the outside faces of said end caps; washers are mounted on said threaded shaft between said nuts and end cap;
 whereby said threaded shaft may rotate about its longitudinal axis while being restrained from moving axially.

4. A pipe rack fastener according to claim 3, wherein said end caps have inner and outer parts integrally connected; said inner parts each having a cross-sectional configuration to form an interferance fit with the inside of said housing; and said outer parts each having a cross-sectional configuration similar to the external configuration of said housing.

5. A pipe rack fastener according to claim 1, wherein said tension mechanism comprises a tubular housing with a polygonal cross-sectional internal configuration, and said driving means comprises a threaded shaft mounted in said housing to rotate about its longitudinal axis while being restrained against axial movement;

said housing has a longitudinal slot in a lateral wall thereof extending parallel to the longitudinal axis of said threaded shaft;

said movable portion comprises a plate with a polygonal configuration similar to said housing cross-sectional configuration so that said plate may slide along the length of and within said housing while being fixed against rotation relative thereto; said plate has a central aperture and a threaded nut welded thereto above said aperture and threaded on said threaded shaft; and a flange is fixed to said plate and extends through said slot to the exterior of said housing, said coupling means mounted on said flange.

6. A pipe rack fastener according to claim 1, wherein said driving means comprises a threaded shaft mounted in a housing for rotation about its longitudinal axis, but fixed axially; said shaft has a crank-like handle extending from one end thereof to facilitate manual rotation thereof.

7. A pipe rack fastener according to claim 1, in combination with a pipe rack, the fastener is mounted on said rack adjacent one side and intermediate the ends thereof.

8. A pipe rack fastener for securing pipe-like articles to a rack comprising:

a tensioning mechanism having a fixed portion, a movable portion and driving means for moving said movable portion relative to said fixed portion, said movable portion including coupling means for releasably receiving a flexible cord, said coupling means including a U-shaped channel having a bight and two legs extending from said bight, each leg having a notch which extends from a free end of each leg inwardly toward said bight;

mounting means coupled to said tensioning mechanism for attaching said tensioning mechanism to a rack; and a flexible cord having a fixed end and a free end, said fixed end being fixedly attached to one of said mounting means and said tensioning mechanism fixed portion, the portion of said cord adjacent said free end having a plurality of enlargements fixed thereon and spaced along the length of said free end portion of said cord, the width of each notch being slightly greater than the cross-sectional dimension of said cord, but less than the cross-sectional dimension of said enlargement so that a portion of said cord adjacent one enlargement may be placed in one of said notches and said one enlargement will be trapped in said U-shaped channel upon movement of said movable portion to tighten said cord about the articles on the rack to couple selectively and releasably said enlargements to said coupling means of said tension mechanism movable portion;

whereby, when the fastener is attached to a rack, said cord may be looped about the rack and articles thereon with the size of the loop roughly set by selectively coupling a particular enlargement to said coupling means, and the articles may be secured on the rack by actuating said driving means to move said movable portion to tighten said cord about the articles.

9. A pipe rack fastener according to claim 8, wherein said driving means comprises a threaded shaft mounted in a housing for rotation about its longitudinal axis, but fixed axially; said shaft has a crank-like handle extending from one end thereof to facilitate manual rotation thereof.

10. A pipe rack fastener for securing pipe-like articles to a rack comprising:

a tensioning mechanism having a fixed portion, a movable portion and driving means for moving said movable portion relative to said fixed portion, said movable portion including coupling means for releasably receiving a flexible cord;

mounting means coupled to said tensioning mechanism for attaching said tensioning mechanism to a rack, said mounting means comprising an L-shaped brace with two legs and a tube fixed at one end thereof to the outer surface of each of said brace legs, said tubes extending generally perpendicular to each other, said tensioning mechanism suspended between and fixedly attached to the other ends of said tubes; and a flexible cord having a fixed end and a free end, said fixed end being fixedly attached to one of said mounting means and said tensioning mechanism fixed portion, the portion of said cord adjacent said free end having a plurality of enlargements fixed thereon and spaced along the length of said free end portion of said cord, each of said enlargements adapted to be selectively and releasably coupled to said coupling means of said tensioning mechanism movable portion;

whereby, when the fastener is attached to a rack, said cord may be looped about the rack and articles thereon with the size of the loop roughly set by selectively coupling a particular enlargement to said coupling means, and the articles may be secured on the rack by actuating said driving means to move said movable portion to tighten said cord about the articles.

* * * * *